Patented Feb. 10, 1953

2,628,218

UNITED STATES PATENT OFFICE 2,628,218

PROCESS FOR PREPARING POLYAMIDES FROM A DINITRILE AND A DITERTIARY ALCOHOL OR ESTER OF THE LAST

Eugene Edward Magat, Wilmington, Del., assignor to E. I. du Pont de Nemours & Company, Wilmington, Del., a corporation of Delaware No Drawing. Application January 25, 1949, Serial No. 72,774

8 Claims. (Cl. 260—78)

This invention relates to a novel process for the preparation of synthetic linear polyamides, which polyamides are suitable for preparation of filaments, fibers, yarns, fabrics, films and the like. The present invention is particularly directed to a new method for making the fiber-forming polyamides described in U. S. Patents 2,071,250 and 2,130,948.

Synthetic linear polyamides of a high enough molecular weight to be useful for textile purposes are generally difficult to prepare. One of the main difficulties resides in the fact that very high temperatures and critical pressure conditions are necessary during the polymerization process. For example, when a representative polyamide, such as polyhexamethyleneadipamide, is prepared, a polymerization time up to four or five hours at temperatures in the vicinity of 275° C. and pressures up to and including 250 p. s. i. are necessary. Such a process, because of the heavy equipment, high temperatures and the like, must of necessity be rather expensive and, therefore, it is obvious that if these same polyamides could be prepared at room temperature without such special processing conditions, a much cheaper polymerization process could be realized placing polyamides on a better economic footing.

An object of this invention therefore is to provide a simple and economical process for preparing filament-, and film-forming synthetic linear polyamides.

Another object is to prepare synthetic linear polyamides by a polymerization reaction carried out at substantially room temperature in contradistinction to the high temperatures (180–300° C.) and, hence, expensive polymerization reaction required to form linear polyamides by the processes of the prior art. These and other objects will more clearly appear hereinafter.

The objects above stated are realized by this invention which, briefly stated, comprises reacting an organic dinitrile with a compound selected from the group consisting of tertiary alcohols and tertiary esters containing as the sole reacting groups alcohol and ester groups, in the presence of a strong acid catalyst. After the reaction has proceeded for a length of time sufficient to form a polymer of the desired high molecular weight, a polymer, which has the characteristic recurring group of a polyamide, may be isolated by precipitation with water followed by neutralization, filtration and drying. This product may then be melt-, dry-, or wet-spun or cast to form filaments, fibers, films, etc. by processes well-known in the art.

The principle of this new reaction is exhibited by the following general equations and formulae, wherein the catalyst is a strong acid and R and Z are divalent organic radicals free of reacting groups, R', R'' and R''' are monovalent organic radicals free of reacting groups, and $n$ denotes any whole number:

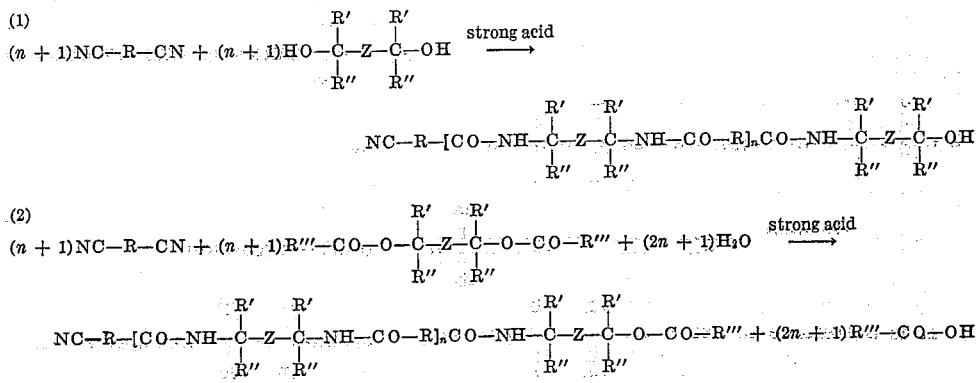

at room temperature without such special processing conditions, a much cheaper polymerization process could be realized placing polyamides on a better economic footing.

The operable dinitriles may be formulated as NC—R—CN, in which R is a bivalent organic radical, preferably selected from the groups consisting of bivalent hydrocarbon radicals and bivalent heterocyclic radicals, or is non-existent as in the case of cyanogen. The bivalent radical joining the nitrile groups may be aliphatic or aromatic, cyclic or heterocyclic, saturated or unsaturated and may be unsubstituted or substituted by groups which do not interfere with the linear polymer-forming reaction. Thus, the dinitrile may contain primary alcohol and other unreactive groups, for example primary ether, sulfide, ketone, ester of primary alcohol, amide, halogen and the like. Specific suitable dinitriles by way of example are the following: succinonitrile, glutaronitrile, adiponitrile, pimelonitrile, suberonitrile, azelonitrile, sebaconitrile, isophthalonitrile, phthalonitrile, 1,8-naphthalonitrile, hexahydroterephthalonitrile, beta-phenyl adiponitrile, beta-methyl adiponitrile, 4-keto-pimelonitrile, 3-nitrophthalonitrile, 1,4-dicyanobutene-2. Preferably the radical joining the nitrile groups is a bivalent hydrocarbon radical. A mixture of two or more dinitriles may be used if copolymers are desired.

Ditertiary alcohols and esters having no other functional group reactive under the conditions of this reaction are, in general, suitable for reaction with the dinitriles as described previously to produce synthetic linear polyamides. The reason for restricting this definition to tertiary esters and tertiary glycols having no other functional groups is obvious if a linear polyamide is desired, since other functional groups would tend to induce cross-linking to give a resultant cross-linked polymeric material that would be infusible and insoluble. As suitable examples of glycols operative in the process of this invention may be mentioned:

2,7-dimethyl-2,7-octanediol
3,8-diethyl-3,8-decanediol
4,9-dipropyl-4,9-dodecanediol
2,10-dimethyl-2,10-undecanediol
3,11-diethyl-3,11-tridecanediol
2,11-dimethyl-2,11-dodecanediol
3,12-diethyl-3,12-tetradecanediol
4,13-dipropyl-4,13-hexadecanediol
1,4-bis(3'-hydroxy-3'-methyl butyl) benzene An alternative group of related reactants suitable for making polyamides comprises the cyano-alcohols and the cyano-esters. Here again it is necessary that the alcohol or ester be tertiary. With this class of reactants, a self-condensation occurs under the conditions of the process of this invention and a polyamide is formed. As some examples of suitable cyano-alcohols, there may be mentioned the following:

2-hydroxy-2-methyl-6-cyanohexane
2-hydroxy-2-methyl-9-cyanononane
3-hydroxy-3-methyl-8-cyanooctane
p-(3-hydroxy-3-methyl butyl) benzonitrile
2-hydroxy-2-methyl-7-cyano-5-oxaheptane Representative cyano-esters may be easily obtained by the reaction of any of the above cyano-alcohols with acid chlorides, e. g., acetyl chloride to form the corresponding acetate. Of course, it will be realized that other suitable esterification procedures well known in the art may be used.

It is preferable to use a 1:1 mol ratio within ±10% of dinitrile and glycol or diester if a relatively long-chain polymeric product is desired. If a higher ratio of one or the other is present, the excess constituent tends to serve as a diluent and a polymerization is restricted, since each embryonic polymeric molecule can only grow to the extent of availability of the component present in the smaller amount.

It has been found, in general, that strong acids are useful as catalysts for the process of this invention. Examples of suitable acids are sulfuric acid, phosphoric acid, alkane sulfonic acid, formic acid, or a mixture of various acids, such as a mixture of sulfuric and phosphoric acids. The acid catalyst may very conveniently be used as the reaction medium.

In general, it is not necessary to heat the reagents since the reaction usually takes place spontaneously with more or less evolution of heat. In some cases, however, where less active reactants are employed, and/or weaker acids are used as catalysts, heating may well be advantageous. The reaction may be carried out in the range of —20° C. or lower up to 80° C. or higher, with the optimum range 20° C. to 40° C. preferred. External cooling of the reaction mixture may be employed where volatile reactants are used or the nature of the reactants is such that external cooling is needed to keep the temperature below about 80° C.

The time of reaction required has been found to vary somewhat according to the particular glycol, diester or dinitrile used, although a few hours are sufficient to substantially complete the reaction in most cases. The particular acid medium in which a reaction takes place may also increase or decrease the time necessary for a complete reaction. In some cases a very short period, about an hour or less, is sufficient, although in the case of less reactive ingredients, this time of reaction may run up to as much as one or two days or more.

The order in which the reactants are mixed is not important and may be varied to suit the particular case in hand. It has been found advantageous, however, in most cases to mix or dissolve the glycol or diester in the dinitrile first and then add this mixture to the acid solvent. This, however, is not an essential step in the process and merely constitutes a convenient method for adding the reactants in equivalent amounts. It will normally not be necessary to use an additional solvent, since many glycols and diesters form a compatible solution with dinitriles and dissolve in each other completely.

It is preferred that the concentration of the reactants in the acid catalyst be rather low so that rate of reaction will not be too fast and cause gelation before the reactants have been completely added to the acid. Concentration of the reactants in the acid may be from 2 to 40% by weight based on the total weight of the reaction mixture, with the range 10 to 20% preferred.

Polyamides of this invention may be prepared in reactors constructed of or lined with glass, porcelain, enamel, silver, gold, platinum, etc., the main requirement being, of course, that the acid used in the catalyst should not react with the reactor material. This is rather important since certain metal salts have a tendency to produce a colored polymeric product and may, in fact, inhibit the reaction.

The properties of a given polyamide, of course, will vary over a considerable range depending upon the molecular weight. Average molecular weights of the polyamides are very difficult to determine because of their limited solubility in suitable solvents. However, since intrinsic viscosity gives an indication of the degree of polymerization, it is to be used hereinafter as a measure thereof. It suffices to say that, in general, the process of this invention is capable of producing polyamides having intrinsic viscosities varying from 0.1 up to 2.5 or higher which comprehend polyamides of filament- and film-forming ability.

The expression "intrinsic viscosity" denoted by the symbol $(\eta_0)$, used herein as a measure of the degree of polymerization of the polyamide, is defined as follows:

$$\frac{\ln(\eta_r)}{C}$$

as C approaches 0 wherein $(\eta_r)$ is the viscosity of the solution of the polyamide in meta-cresol divided by the viscosity of meta-cresol per se measured in the same units at the same temperature, and C is the concentration in grams of the polyamide per 100 cc. of solution.

The following examples wherein are set forth preferred embodiments further illustrate the principles and practice of this invention. Parts are by weight unless otherwise indicated.

*Example I*

A solution of 2.3 parts 2,11-dimethyl-2,11-dodecanediol, 1.08 parts adiponitrile in 4.8 parts of 90% formic acid is heated with refluxing for five hours. After pouring into a mixture of ice and water a white polymeric substance is obtained by filtration. The polymer is soluble in alcohol and can be reprecipitated as a fine white powder by addition of water (yield 1.1 parts). The polymer softens at 95–100° C. and can be melt spun to give fibers. The polymer is poly-($a,a,a',a'$-tetramethyl) decamethylene adipamide.

*Example II*

A solution of 2.3 parts of 2,11-dimethyl-2,11-dodecanediol, 1.06 parts 1,4-dicyanobutene-2 in 4.8 parts 90% formic acid is heated with refluxing for five hours. A sticky polymer is obtained by pouring the mixture into water, however on standing the polymer turns to a non-sticky solid (yield 3 parts). The solid softens at 90–100° C. and can be melt spun to silky fibers or melt cast into transparent films. The polyamide contains an unsaturated linkage and may be cross-linked by heating with peroxides. The polymer is poly($a,a,a',a'$-tetramethyl) decamethylene muconamide.

*Example III*

To a solution of 2,11-dimethyl-2,11-dodecanediol (1.15 parts) and adiponitrile (0.54 part) in 3.1 parts of glacial acetic acid is added 100% sulfuric acid (1.8 parts). The exothermic reaction is kept at 30° C. for 3 hours, at the end of which time the viscous liquid is poured into water. The polymer is dissolved in alcohol and reprecipitated by addition of water to give 1 part of white, powdery, polymeric substance. The polymer melts at 80–100° C. and can be melt spun to silky fibers. The intrinsic viscosity is 0.14. The polymer is poly($a,a,a',a'$-tetramethyl-decamethylene adipamide and analyzes for 8.40, 8.33% nitrogen (theoretical value 8.30%).

*Example IV*

Using terephthalonitrile instead of adiponitrile as in Example III, a polyamide of intrinsic viscosity 0.21 is obtained.

*Example V*

Using p-xylene cyanide in place of adiponitrile as in Example III, a polyamide of intrinsic viscosity 0.19 is obtained.

*Example VI*

Five parts of 2-hydroxy-2-methyl-7-cyano-5-oxaheptane are added slowly to 35 parts of 72% aqueous sulfuric acid while the temperature is kept at 20–30% C. After standing for six hours the viscous solution is poured into water and a sticky polymer precipitates out of the solution.

*Example VII*

Five parts of $\beta$-hydroxy isobutyl cyanide are added slowly to 45 parts of concentrated sulfuric acid at 10–15° C. The solution thickens rapidly and is poured into water after 2 hours. The $\beta$-amino acid polymer remains dissolved in the aqueous solution.

Copolyamides may be easily prepared by the process of this invention simply by the expedient of using two or more dinitriles with a single glycol or diester, or again by using a multiplicity of glycols or diesters with a nitrile plus any combination of these reactants. In general, such copolyamides have lower melting points than the simple polyamides but their physical properties are still such that they are eminently useful for application in the textile, film and coating arts. Their wider solubility characteristics and lower melting points give them certain obvious advantages for specialized uses.

The fiber-forming linear polyamides resulting from the process of this invention can be spun into continuous filaments in a number of ways. One method of spinning (wet process) consists in dissolving the polyamide in a suitable solvent and extruding the resultant solution through orifices into a liquid which dissolves the solvent but not the polyamide, and continuously collecting the filaments thus formed on a suitable revolving drum or spindle. Another method (dry process) consists in extruding a solution of the polyamide into a chamber (which may be heated) where the solvent is removed by evaporation. Still another method (melt process) consists in extruding the molten polyamide through orifices into a suitable atmosphere where it congeals to a filament. In these various methods of spinning, the fiber-forming mass may be forced through the orifice by means of gas pressure or by means of a constant volume delivery pump. By similar processes known to the art the polyamides can be formed into rods, bristles, sheets, foils, ribbons, films and the like. In the various methods of forming shaped articles from fiber-forming polyamides and particularly when this is done from solutions of the polymers, the characteristics of the filaments, etc. may be altered by blending the polyamides with other polyamides, such as polyhexamethylene adipamide, or with resins, plasticizers, cellulose derivatives, etc. As cellulose derivatives which can be blended with the polyamide solutions might be mentioned ethyl cellulose, benzyl cellulose, cellulose acetate, etc.

As described above, many of the polyamides of this invention may be formed into filaments, fibers and the like by the process known in the art as melt spinning. However, in the case of certain polyamides which may have melting points of 300° C. and higher, it is frequently not feasible or economical to spin at such high temperatures. When it is desired to form polymers of this type into shaped articles, it will normally be found advantageous to use the dry or wet spinning techniques. As examples of solvents which may be used to advantage in either one or both of these spinning techniques, the following may be mentioned: meta-cresol, phenol, chloral hydrate, formic acid, sulfuric acid, ethyl alcohol, alcohol/chloroform mixtures, etc.

The advantages to be derived from the practice of this invention are obvious. Low temperature polymerization simplifies the equipment and gives rise to substantial savings in operation and in plant investment. An advantage of great importance too resides in the fact that the polymeric products resulting from the process of this invention are obtained directly in the finely divided state which obviates the necessity of the

I claim:

1. A process for producing synthetic linear polyamides which comprises reacting within the temperature range of −20° to 80° C. an organic dinitrile of the formula: NC—R$_m$—CN, wherein R is a divalent radical from the group consisting of hydrocarbon and unreactive heterocyclic radicals and $m$ is a numeral from 0 to 1, and water with a substantially mol equivalent of the dinitrile of a compound selected from the group consisting of ditertiary alcohols and carboxylic acid esters of ditertiary alcohols containing as the sole reacting groups alcohol and ester groups, in a strong acid reaction medium and continuing the reaction within said temperature range until a polymer of the desired intrinsic viscosity is produced.

2. A process for producing synthetic linear polyamide which comprises reacting within the temperature range of 20° to 40° C. an organic dinitrile of the formula: NC—R$_m$—CN, wherein R is a divalent radical from the group consisting of hydrocarbon and unreactive heterocyclic radicals and $m$ is a numeral from 0 to 1, and water with a substantially mol equivalent of the dinitrile of a compound selected from the group consisting of ditertiary alcohols and carboxylic acid esters of ditertiary alcohols containing as the sole reacting groups alcohol and ester groups, in a strong acid reaction medium and continuing the reaction within said temperature range until a polymer of the desired intrinsic viscosity is produced.

3. A process for producing synthetic linear polyamides which comprises reacting within the temperature range of −20° to 80° C. substantially equal molecular proportions of an organic dinitrile of the formula: NC—R$_m$—CN, wherein R is a divalent radical from the group consisting of hydrocarbon and unreactive heterocyclic radicals and $m$ is a numeral from 0 to 1, and water and a compound from the group consisting of ditertiary alcohols and carboxylic acid esters of ditertiary alcohols containing as the sole reacting groups alcohol and ester groups, in a strong acid reaction medium in which the total concentration of said dinitrile and said ditertiary compound is within the range of 2% to 40% by weight, and continuing the reaction within said temperature range until a polymer of the desired intrinsic viscosity is produced.

4. The process of claim 3 wherein the total concentration of said dinitrile and said ditertiary compound is within the range of 10% to 20% by weight.

5. The process for producing a synthetic linear polyamide which comprises reacting within the temperature range of −20° to 80° C. adiponitrile with a substantially mol equivalent of 2,11-dimethyl-2,11-dodecanediol and water in a strong acid reaction medium and continuing the reaction within said temperature range until a polymer of the desired intrinsic viscosity is produced.

6. The process for producing a synthetic linear polyamide which comprises reacting within the temperature range of −20° to 80° C. 1,4-dicyanobutene-2 with a substantially mol equivalent of 2,11-dimethyl-2,11-dodecanediol and water in a strong acid reaction medium and continuing the reaction within said temperature range until a polymer of the desired intrinsic viscosity is produced.

7. The process for producing a synthetic linear polyamide which comprises reacting within the temperature range of −20° to 80° C. terephthalonitrile with a substantially mol equivalent of 2,11-dimethyl-2,11-dodecanediol and water in a strong acid reaction medium and continuing the reaction within said temperature range until a polymer of the desired intrinsic viscosity is produced.

8. The process for producing a synthetic linear polyamide which comprises reacting within the temperature range of −20° to 80° C. p-xylylene cyanide with a substantially mol equivalent of 2,11-dimethyl-2,11-dodecanediol and water in a strong acid reaction medium and continuing the reaction within said temperature range until a polymer of the desired intrinsic viscosity is produced.

EUGENE EDWARD MAGAT.

REFERENCES CITED

The following references are of record in the file of this patent:

UNITED STATES PATENTS

| Number | Name | Date |
|---|---|---|
| 2,071,250 | Carothers | Feb. 16, 1937 |
| 2,457,660 | Gresham et al. | Dec. 28, 1948 |

OTHER REFERENCES

Ritter et al., Journ. American Chemical Society, vol. 70, 1948, pp. 4048 to 4050.